United States Patent [19]

Osterwald et al.

[11] Patent Number: 5,158,389
[45] Date of Patent: Oct. 27, 1992

[54] HOLLOW SECTION FOR COUPLING WITH OTHER SECTIONS

[75] Inventors: Werner Osterwald, Hannover; Klaus-Georg Bottger, Ronnenberg, both of Fed. Rep. of Germany

[73] Assignee: VAW Aluminium AG, Bonn, Fed. Rep. of Germany

[21] Appl. No.: 151,369

[22] Filed: Aug. 2, 1988

Related U.S. Application Data

[60] Continuation-in-part of Ser. No. 4,313, Jan. 8, 1987, abandoned, which is a continuation of Ser. No. 689,854, Jan. 9, 1985, abandoned, which is a division of Ser. No. 497,924, May 25, 1983, abandoned.

[30] Foreign Application Priority Data

Jun. 4, 1982 [DE] Fed. Rep. of Germany ..... 82104914

[51] Int. Cl.$^5$ .................... F16L 41/00; F16B 9/00; E06C 7/08
[52] U.S. Cl. .................... 403/248; 403/277; 138/121; 138/173; 29/523; 285/222; 285/382.4
[58] Field of Search ............... 138/121, 173; 285/189, 285/222, 382.4, 382.5, DIG. 4; 29/523; 182/228; 403/248, 277

[56] References Cited

U.S. PATENT DOCUMENTS

| | | | |
|---|---|---|---|
| 3,039,186 | 6/1962 | Stoyer et al. | 285/222 X |
| 3,140,540 | 7/1964 | Greenman | 29/523 |
| 3,349,870 | 10/1967 | Lieblein | 29/523 |
| 3,962,843 | 6/1976 | King | 285/382.4 |
| 4,406,048 | 9/1983 | Bailey | 29/523 |
| 4,597,687 | 7/1986 | Colas | 182/228 |
| 4,698,896 | 10/1987 | Osterwald et al. | 182/228 |
| 4,924,584 | 5/1990 | Harney | 403/277 |

FOREIGN PATENT DOCUMENTS 2125500 12/1972 Fed. Rep. of Germany .
972322 10/1964 United Kingdom .

*Primary Examiner*—James E. Bryant, III
*Attorney, Agent, or Firm*—Darby & Darby

[57] ABSTRACT

A coupling including a first hollow section having longitudinal corrugations and a second section having an aperture therein. The coupling is made according to the method including the steps of inserting the first hollow section having longitudinal corrugations into the aperture in the second section so that at least a portion thereof including the corrugations extends into and beyond the aperture, the first hollow section being selected so that its cross-sectional length exceeds the perimeter of the aperture. At least the portion of said first hollow section beyond said aperture is then expanded so as to smooth the corrugations, while avoiding stretching the wall of the first hollow section whereby the exterior size of the hollow section exceeds the entire perimeter of the aperture and the cross-sectional length remains unchanged.

10 Claims, 1 Drawing Sheet

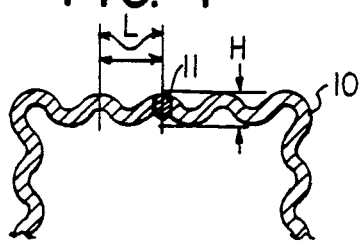
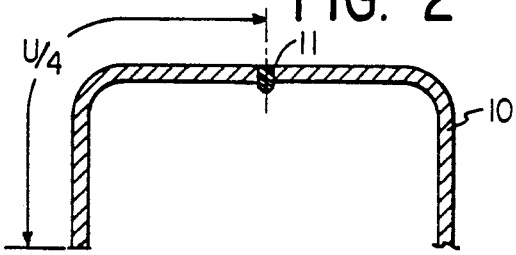
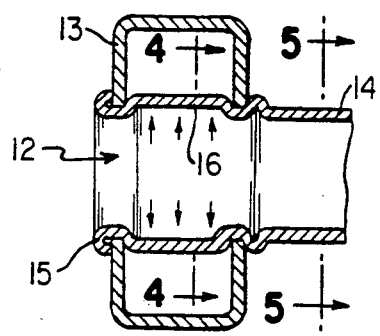
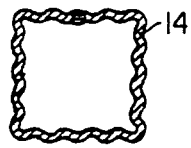
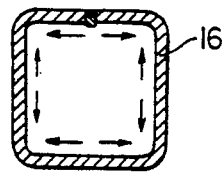
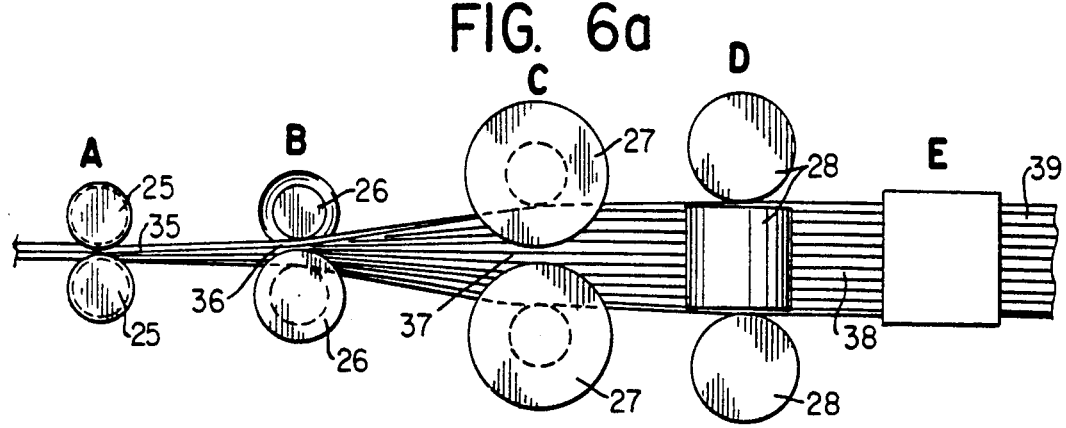
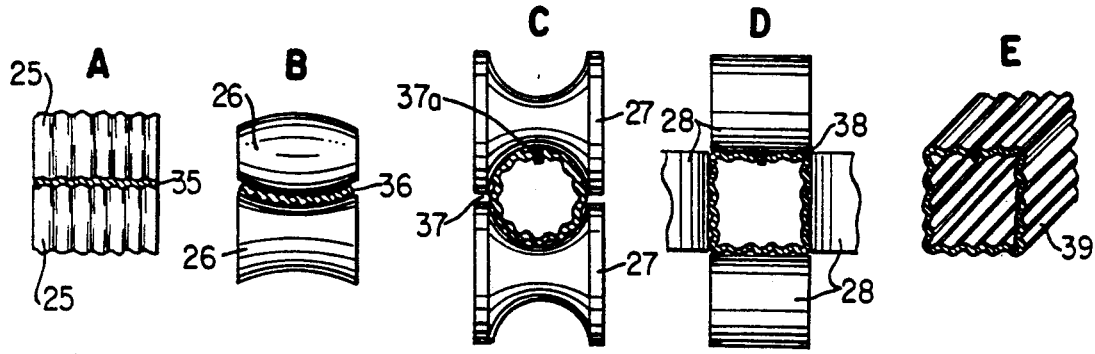

HOLLOW SECTION FOR COUPLING WITH OTHER SECTIONS

RELATED APPLICATION DATA

This application is a continuation-in-part of U.S. application Ser. No. 004,313, filed Jan. 8, 1987, which is a continuation of U.S. application Ser. No. 689,854, filed Jan. 9, 1985, and which is a divisional of U.S. application Ser. No. 497,924, filed May 25, 1983 now all abandoned.

BACKGROUND OF THE INVENTION

1. Field of the Invention

The invention relates to a sectional form for connection with other sections by coupling, flanging or the like. The sectional form is inserted into the bore of the section to be connected and expanded therein so that a locking union results. The invention further relates to the method of manufacture of such forms and the method for their application.

2. Description of the Prior Art

The connecting of a hollow section with other sections by coupling or flanging is known in the art. The hollow sections generally are, tubular, and may have cylindrical, square, rectangular or other desired cross-sections. These tubular hollow sections are coupled to other tubular sections, or to solid or hollow rails, etc. If the materials, usually metal, of the hollow sections to be connected have low ductility values there is a danger that in the process of coupling or flanging cracks will develop, which permanently weaken the union of the sections. As these cracks are often not immediately recognized, such unions offer no assurance of operational safety.

A great many hollow section forms are manufactured by extrusion. For a variety of reasons, the surface of the extruded products are provided with grooves or ribs, used for example for receiving screws or for increasing rigidity. When applying the fluted surfaces by coupling or flanging, there necessarily forms at the groove troughs or at the rib flanks weakened zones which lead to premature tearing during the shaping process. In the coupling process the grooves or ribs are expanded and therefore stretched, thus causing the material required for the process of coupling or flanging to be taken out of the wall thickness of the hollow section; this may encourage tearing during the coupling process.

It is also known to connect longitudinally welded pipes with other sections by coupling or flanging. In this case there is increased danger of tearing in the vicinity of the weld since imperfections at the weld may cause the material's extensibility to be exceeded. Difficulties of this type with aluminum ladder rungs have led to special designs where the connection is made possible by a center ridge inside the section for receiving a screw (see for example, German Utility Model DE-Gm 77 37 792). The present invention overcomes the problems of the prior art by providing the wall of the sectional shape with corrugations the total length of which correspond substantially to the periphery of the sectional form as applied by coupling or flanging.

OBJECTS OF THE INVENTION

It is an object of the present invention to provide a method of coupling and a metal section suitable for connection with other sections by coupling or flanging.

It is a further object of this invention to provide a metal section suitable for connection with other sections and which retains its structural integrity even under extreme deformation and high loads and a coupling method therefore.

It is another object of the invention to provide a metal section suitable for connection with other sections and a coupling method therefore which permits the use of thinner hollow sections without sacrificing the structural integrity of the coupling during the shaping process.

Further objects and advantages of the present invention will become more apparent upon reference to the following description and the drawings annexed hereto.

SUMMARY OF THE INVENTION

Applicants' invention is directed to a coupling made from a first hollow section having longitudinal corrugations and a second section having an aperture therein. The coupling is made by inserting the first hollow section having longitudinal corrugations into the aperture of the second section so that at least a portion of the first section including the corrugations extends into and beyond the aperture. The first hollow section is selected so that its cross-sectional length exceeds the perimeter of the aperture. After the first section has been extended into and beyond the aperture, the portion of the first hollow section extending beyond the aperture is expanded, so as to smooth the corrugations, while avoiding stretching the wall of the hollow section. The exterior size of the hollow section exceeds the entire perimeter of the aperture and the cross-sectional length remains unchanged. In this manner, the expanded first hollow section is coupled within the aperture of the second section.

An important aspect of the invention is that no thinning of the hollow section walls results to the expanded second portion, and therefore no weakness is imparted to the hollow section of the coupling. This important characteristic of the coupling is achieved by providing that the cross-sectional length of the hollow section exceed the perimeter of the first section. This arrangement allows the hollow section to be expanded while maintaining a constant wall thickness for the hollow section. The coupling of the present invention is particularly useful under conditions of extreme deformation shaping and high load or stress.

The invention also includes the method used for coupling and fabricating the hollow sections. The use of plastically deformable, low-resilience material of any desired cross-section, into which grooves or flutings are formed is thus permitted. The wall of the first hollow section is longitudinally corrugated. The total length of the corrugation ($n \times L$) viewed in cross-section corresponds substantially to the circumference (U) of the section form in the coupled or flanged-on state.

While heretofore the material required for the process of coupling or flanging was taken out of the wall thickness of the sectional shape, in the present invention a portion of the sheet material is corrugated before being shaped and welded into a pipe or tube. The corrugations are then smoothed when coupled or flanged. The wall thickness of the section can be relatively thin, because as a result of the invention material flow is suppressed. The degree of corrugation is selected to permit the corrugated section to be inserted into the bore of the section to be connected and then expanded and smoothed.

The coupling taught in the present invention is particularly suitable for use in longitudinally welded aluminum pipes.

Compared with steel, aluminum has lower extensibility values, thus encouraging irregular flow phenomena during the coupling process. Heretofore this has always led to substantial waste and expensive testing methods, since fissures and cracks may not be recognized immediately. In the present invention, neither the weld seam nor the thin-walled aluminum of the longitudinally welded pipes is subject to high stress during the shaping.

BRIEF DESCRIPTION OF THE DRAWINGS

FIG. 1 shows a sectional shape in the corrugated state according to the invention;

FIG. 2 is the sectional shape according to the invention in the smoothed state;

FIGS. 3, 4 and 5 show a method of application of the invention;

FIGS. 6A and 6B show schematically the method for the production of the sectional shape according to the invention.

DESCRIPTION OF THE PREFERRED EMBODIMENT

FIG. 1 shows (in cross-section) a corrugated longitudinally welded hollow section 10 including bead 11 representing a weld. The height of the corrugation is designated by H, and the length of the corrugation by L. The total circumference of the flanged-on part approximately obeys the relation that the circumference U equals the sum of all wave lengths L, that is $U=nL$, where $n$ = the number of corrugations. For most practical purposes a simple equation can be derived from the length L and amplitude height H as follows: The circumference U corresponds to the number of waves multiplied by the amplitude height H and the constant, that is $U=nH$.

FIG. 2 shows a partial cross-section of the hollow section 10 of FIG. 1 after application. The quarter circumference is designated by U/4. While the wall thickness of the hollow section has remained essentially unchanged, the contour has clearly increased due to the smoothing of the waves. The expanding tool must, of course, be formed so that squeezing, pinching or edging of the material during the flanging process is prevented. In a preferred embodiment the corrugations have a contour composed of sinusoidal arcs. The invention however is not limited to this contour and shallow as well as sharp curves may be employed in the corrugation design.

Referring to FIG. 3 a preferred embodiment of the invention is utilized in a ladder which includes side rails, also known as stringers, and rungs. For this type of connection a pair of holes 12 are stamped, one in each wall of the double-walled stringer 13 for receiving the cross-section of the hollow rungs 14. The hollow rung is passed through the pair of holes in the stringer, far enough for the rung to extend, about 5 mm on the outer side of the ladder. The coupling is achieved on the one hand by expansion of the hollow rung in the region located inside the stringer, between the two walls, and on the other, by flanging on the rung end projecting from the stringer as shown by element 15 in FIG. 3. FIGS. 3–5 illustrate the process.

Referring to FIG. 4 corrugated hollow section 14 is shown in transverse section. FIG. 5 shows section 5—5 which is a cross section of the applied pipe 16, the arrows indicating the direction in which the material has been lengthened through application.

This type of connection makes high demands on the rung section with respect to its ability to expand and to be flanged, as plastic deformation of the rung wall takes place during expanding and flanging. The type of material used for the rung governs the extent to which plastic deformation of the material is feasible. As a rule, soft materials with high extensibility values permit greater expansion or flanging than harder materials which have low extensibility values.

For sections that are subject to high loads such as ladder sections, the material must not have a low extensibility value; instead, a very hard material should be chosen to handle the loads, especially at the coupling point between the sections.

Limited flanging or expansion ability of a rung may also be due to reduction of the cross-section, for example, in weld seams in longitudinally welded pipes.

Since a certain minimum flanging or expansion must occur for efficient joining of two sections in the above-described manner, there is a danger, depending on the type and configuration of the rung material and on the method of production of the rung (longitudinally welded or extruded), that the tensile strength of the rung wall will be exceeded causing it to tear and the coupling to fail. This problem is overcome in the present invention by the corrugations having a substantially constant wall thickness. Thus during expansion for flanging, the additional material volume required for the outer cross-section in the expanded region is made available from the flattened corrugations. It is particularly desirable to select the radii of the wave troughs and peaks so as to avoid notch effects. It is further desirable to select the contour to have a constant sinusoidal shape free from singularities.

Depending on the type of material and its shape, it may be sufficient to dimension the corrugation so that in the flanging or expansion process a selected proportion of the material in the expanded state results from stretching of the longitudinally corrugated pipe and its wall thickness; the remainder is made available from the smoothing or expansion of the corrugations as described hereinbefore. it is also desirable to select the longitudinal corrugation of the section to be as small as possible to avoid making the rung section unnecessarily heavy and hence expensive.

Refer now to FIGS. 6a and 6b showing the method for producing the hollow section of the invention. FIG. 6a is a schematicized side view of the progress of production flow of the material at steps A through E. FIG. 6b includes the same steps A through E and shows the particular shaping steps in a head-on view of the material as it is shaped.

In FIG. 6a, step A, roll pair 25 produces corrugations in a sheet material as shown by corrugated material 35 in FIG. 6b step A. Turning to Step B, roll pair 26 includes a convex upper roll and concave lower roll to shape the corrugated material 35 in a first bending operation as shown by bent corrugated material 36. In step C roll pair 27, including convex upper and lower pairs shapes the material into a tubular form 37. Longitudinal induction welding is also performed during the step and is represented by welding bead 37a.

Step D includes sizing rolls 28 which further shape the hollow section, which may be, as shown, square in cross-section. Step E shows the completed hollow section.

What is claimed is:

1. A coupling including a first hollow section having longitudinal corrugations and a second section having an aperture therein, said coupling made according to the method comprising the steps of:

inserting said first hollow section having longitudinal corrugations into said aperture in said second section so that at least a portion thereof including said corrugations extends into and beyond said aperture, the first hollow section being selected so that its cross-sectional length exceeds the perimeter of the aperture; and expanding at least the portion of said first hollow section beyond said aperture so as to smooth said corrugations, while avoiding stretching the wall of said first hollow section whereby the exterior size of said hollow section exceeds the entire perimeter of said aperture and the cross-sectional length remains unchanged.

2. A coupling, including a hollow section having longitudinal corrugations and a second section having an aperture with a predetermined perimeter therein, said coupling made according to the method comprising the steps of:

selecting a hollow section having a cross-sectional length which exceeds the perimeter of said aperture, but the exterior size of at least a portion of which has been reduced sufficiently as a result of the introduction of said corrugations to permit it to be inserted into said aperture;

inserting said portion of said hollow section into and beyond said aperture; and expanding at least a portion of said hollow section extending beyond said aperture so that its exterior size exceeds the entire perimeter of said aperture, but its cross-sectional length remains unchanged.

3. The coupling according to claim 1 wherein said corrugations are partly smoothed.

4. The coupling according to claim 2 wherein said corrugations are partly expanded.

5. The coupling of claim 1 wherein said first hollow section is inserted into said aperture so that corrugations are on a first portion ahead of said aperture and on a second portion beyond said aperture, said first hollow section being expanded so that the corrugations on both said first and second portions are smoothed, without stretching said first hollow section, said second section being captured between said first and second portions of said first section when the corrugations thereof are smoothed.

6. The coupling of claim 1, wherein said second section further includes a further aperture corresponding to and aligned with said aperture thereof, said second section being hollow between said apertures, said inserting step comprising inserting said first hollow section into said second section so that the corrugations extend at least between said apertures, at least the portion of said corrugations between said apertures being expanded, so that said first and second sections are locked together.

7. The coupling of claim 6 further comprising the step of flanging said first section outwardly at a location immediately beyond said further aperture.

8. The coupling of claim 2, performed with a second section which includes a further aperture corresponding to and aligned with said aperture thereof, said second section being hollow between said apertures, said inserting step comprising inserting said hollow section into said second section so that the corrugations extend at least between said apertures, at least a portion of said corrugations between said apertures being expanded, so that said hollow and second sections are locked together.

9. The coupling of claim 2, wherein said hollow section is inserted into said aperture so that corrugations are on a first portion ahead of said aperture and on a second portion beyond said aperture, said hollow section being expanded so that the corrugations on both said first and second portions are smoothed, without changing the cross-sectional length of said hollow section, the expansion causing said second section to be captured between said first and second portions of said hollow section.

10. The coupling of claim 8, further comprising the step of flanging said hollow section outwardly at a location immediately beyond said further aperture.

* * * * *

UNITED STATES PATENT AND TRADEMARK OFFICE
CERTIFICATE OF CORRECTION

PATENT NO. : 5,158,389

DATED : October 27, 1992

INVENTOR(S) : Werner Osterwald; Klaus-Georg Bottger

It is certified that error appears in the above-identified patent and that said Letters Patent is hereby corrected as shown below:

On the title page, item (22) Filed: should read:

--Filed: February 2, 1988 -- .

Signed and Sealed this

Nineteenth Day of October, 1993

*Attest:*

BRUCE LEHMAN

*Attesting Officer*   *Commissioner of Patents and Trademarks*